(12) United States Patent
Fiammante et al.

(10) Patent No.: US 11,763,422 B2
(45) Date of Patent: Sep. 19, 2023

(54) FAST COLOR CLUSTERING FOR PREPROCESSING AN IMAGE

(71) Applicant: INTERNATIONAL BUSINESS MACHINES CORPORATION, Armonk, NY (US)

(72) Inventors: Marc Fiammante, Nice Meridia (FR); Jean-Armand Broyelle, Beaulieu (FR)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/305,161

(22) Filed: Jul. 1, 2021

(65) Prior Publication Data

US 2023/0005102 A1    Jan. 5, 2023

(51) Int. Cl.
| | | |
|---|---|---|
| G06T 3/40 | (2006.01) | |
| G06V 10/56 | (2022.01) | |
| G06F 18/22 | (2023.01) | |
| G06F 18/231 | (2023.01) | |

(52) U.S. Cl.
CPC ............ G06T 3/4015 (2013.01); G06F 18/22 (2023.01); G06F 18/231 (2023.01); G06V 10/56 (2022.01)

(58) Field of Classification Search
None
See application file for complete search history.

(56) References Cited

U.S. PATENT DOCUMENTS 7,171,045 B1 *   1/2007   Hamilton ............... G06T 7/90
358/426.14

2012/0140987 A1 *   6/2012   Singh ..................... G06V 10/46
382/164

(Continued)

FOREIGN PATENT DOCUMENTS

| CN | 107818341 A |   | 3/2018 |   |
|---|---|---|---|---|
| CN | 114385847 A | * | 4/2022 |   |
| CN | 110866896 B | * | 6/2022 | ........... G06K 9/6223 |

(Continued)

OTHER PUBLICATIONS

Cai, Z.. (2013). Fast color image segmentation based on improved K-means clustering algorithm. Journal of Computational Information Systems. 9. 7069-7077. 10.12733/jcis6883.

(Continued)

*Primary Examiner* — Mohammed Rachedine
(74) *Attorney, Agent, or Firm* — Schmeiser, Olsen & Watts, LLP; Aaron Pontikos

(57) ABSTRACT

An approach is provided for color clustering for preprocessing an image. A cross-product on values of pixels in a source image and a number of bits per channel is determined, rounded to integer values, and left aligned to specify a target image. The following actions are repeatedly performed until a count of colors in the target image equals a target: a least frequent color in the target image is identified, distances between the least frequent color and other colors in the target image are determined, a least distance among the distances is determined, where the least distance is between the least frequent color and a closest color, a merged color is generated by merging the least frequent color and the closest color, and the count of the colors in the target image is reduced by replacing the least frequent color and the closest color with the merged color.

20 Claims, 5 Drawing Sheets

(56) References Cited

U.S. PATENT DOCUMENTS

2021/0225039 A1* 7/2021 Bhunia ............ H04N 19/88
2021/0233251 A1* 7/2021 Rothrock ............ G06V 10/26

FOREIGN PATENT DOCUMENTS

CN        111382680 B  *  4/2023  ......... G06K 9/00671
WO    WO-2020227759 A1  *  11/2020

OTHER PUBLICATIONS

Color Quantization using K-Means; https://scikit-learn.org/stable/auto_examples/cluster/plot_color_quantization.html retrieved from the Internet Mar. 3, 2021; 4 pages.

Color Quantization with OpenCV using K-Means Clustering; https://www.pyimagesearch.com/2014/07/07/color-quantization-opencv-using-k-means-clustering/; retrieved from the Internet on Mar. 3, 2021; 24 pages.

Dong, Liju et al.; A Fast Algorithm for Color Image Segmentation; First International Conference on Innovative Computing, Information and Control 2006; Aug. 30-Sep. 1, 2006; 6 pages.

Fast Color quantization in OpenCV; https://stackoverflow.com/questions/49710006/fast-color-quantization-in-opencv/49715101; retrieved from the Internet May 27, 2021; 10 pages.

Giffon, Luc et al.; QuicK-means: Acceleration of K-means by learning a fast transform; arXiv:1908.08713v1; Aug. 23, 2019; 17 pages.

Muthukrishnan; Reduce the number of Colors of an image using K-Means Clustering; https://muthu.co/reduce-the-number-of-colors-of-an-image-using-k-means-clustering/; Oct. 10, 2019; 9 pages.

Prejmerean, Vasil et al.; Image Color Number Reduction Methods; Proceedings of the National Symposium ZAC2014;Jun. 4, 2014; pp. 42-50.

Wang, Naigang et al.; Ultra-Low-Precision Training of Deep Neural Networks; https://www.ibm.com/blogs/research/2019/05/ultra-low-precision-training/; May 9, 2019; 8 pages.

Zhang, Juyong et al; Fast K-Means Clustering with Anderson Acceleration; arXiv:1805.10638v1; May 27, 2018; 10 pages.

* cited by examiner

FAST COLOR CLUSTERING FOR PREPROCESSING AN IMAGE

BACKGROUND

The present invention relates to image processing, and more particularly to color clustering for preprocessing images in machine learning applications.

Image processing can use ultra-low precision algorithms (i.e., reduced precision machine learning) to accelerate inference and training speed on low compute capability devices (e.g., edge devices). For reduced precision machine learning, target color channels are based on a reduced number of bits in images. Current techniques to reduce the precision of images include posterization/masking, K-Means clustering, and accelerated K-Means clustering.

SUMMARY

In one embodiment, the present invention provides a computer system that includes a central processing unit (CPU), a memory coupled to the CPU, and one or more computer readable storage media coupled to the CPU. The one or more computer readable storage media collectively contain instructions that are executed by the CPU via the memory to implement a method of color clustering for preprocessing an image. The method includes the computer system determining an initial number of colors by adding an integer margin to K. K is an integer equal to a target number of colors that is less than a total number of colors in a source image. The initial number of colors is less than the total number of colors in the source image. The method further includes the computer system determining a number of bits per channel which is greater than the initial number of colors based on $2^{((a\ number\ of\ bits)*(a\ number\ of\ channels))} > (K + $ the integer margin). The method further includes the computer system determining a cross-product on the values of pixels in the source image and the number of bits per channel. The method further includes the computer system rounding the cross-product to integer values. The method further includes the computer system left aligning the rounded cross-product on a specified number of bits. The left aligned rounded cross-product specifies a target image having a number of colors equal to the initial number of colors. The method further includes the computer system determining a count of remaining unique colors in the target image after the determining the cross-product and the left aligning. The method further includes the computer system determining that the count of the remaining unique colors is greater than K. The method further includes repeating the computer system identifying a least frequent color in the target image that has a least frequency among colors in the target image, the computer system determining distances between the least frequent color and other colors in the target image, the computer system determining a least distance among the distances, the least distance being between the least frequent color and a closest color among the other colors, the computer system generating a merged color by merging the least frequent color and the closest color, and the computer system reducing a count of the colors in the target image by replacing the least frequent color and the closest color with the merged color in the colors in the target image, until the count of the colors in the target image is equal to K and the target image is a final target image having K colors.

A computer program product and a method corresponding to the above-summarized computer system are also described and claimed herein.

DETAILED DESCRIPTION

Overview

Reduced precision machine learning applications require target color channels to be based on a reduced number of bits. Current approaches for reducing image precision are (i) computationally expensive and slow or (ii) lose an excessive amount of image quality and image information. The traditional K-Means clustering approach is a common unsupervised machine learning algorithm that creates clusters of pixels to reduce image precision, but the processing time (e.g., for processing video) is slow. Various known accelerated variations on the K-Means algorithm are still based on the discovery of K centroids and therefore spend a significant amount of time on the centroid-pixels distance computations. Other accelerated K-Means approaches enhance speed while sacrificing image quality. Compared to the traditional K-Means approach, simple quantization by integer division and variance quantization are faster, but result in lower quality images.

Embodiments of the present invention address the aforementioned unique challenges of reducing image precision (e.g., four or fewer bits per channel instead of eight bits) by providing an approach for color clustering for preprocessing an image that is fast while retaining a significant amount of image quality and image information. The approach provided by embodiments of the present invention includes applying a cross-product on images to reduce the number of colors and left aligning the result of the cross-product to compute color distance. In one embodiment, the image precision reduction provides a clustering of K colors in a target image by applying the aforementioned cross-product to initially reduce the number of colors in the source image to a number that exceeds K by a specified margin (e.g., a margin of K/2), followed by merging pixels in the target image that have a close color distance until the target image is left with exactly K different colors. As used herein, K is a positive integer. In one embodiment, the process of reducing image precision is one order of magnitude faster than the traditional K-Means approach, while preserving the quality of the image and image information, as indicated in a color histogram.

In one embodiment, the image precision reduction is performed for three channels (e.g., relative to RGB (red-green-blue) images having three channels). In other embodiments, image precision reduction is provided for images having more or less than three channels (e.g., infrared, ultraviolet, etc., as in some satellite images).

System for Color Clustering for Preprocessing an Image

Figure 1:
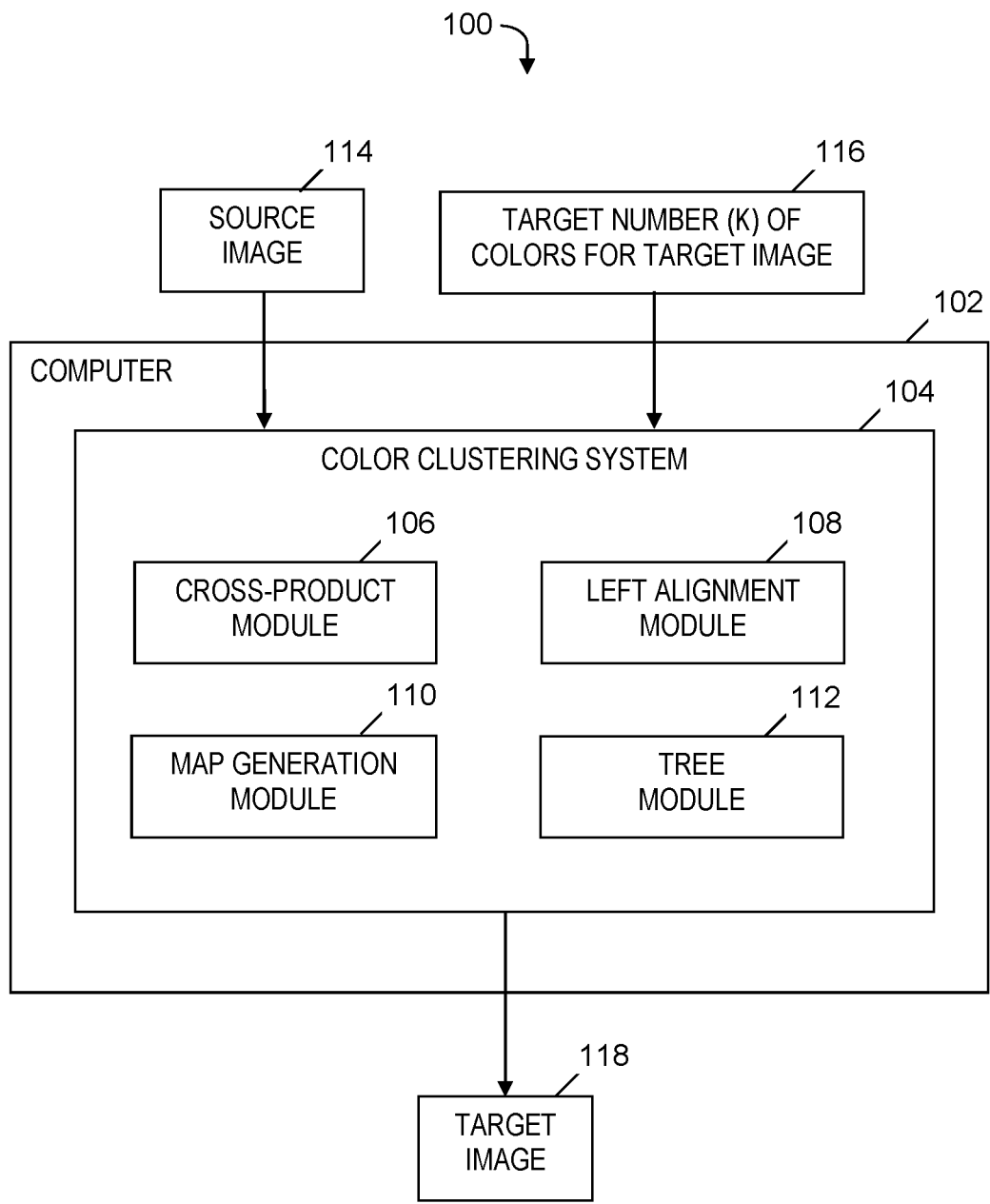
FIG. 1 is a block diagram of a system for color clustering for preprocessing an image, in accordance with embodiments of the present invention.

FIG. 1 is a block diagram of a system 100 for color clustering for preprocessing an image, in accordance with embodiments of the present invention. System 100 includes a computer 102 that includes a software-based color clustering system 104 for reducing image precision by using cross-product reduction and left alignment of the result of the cross-product, while preserving the quality of the image and without losing a significant amount of image information. Color clustering system 104 includes a cross-product module 106, a left alignment module 108, a map generation module 110, and a tree module 112.

Color clustering system 104 receives a source image 114 and a target number of colors 116 for a target image 118 that is generated by color clustering system 104. The target number of colors 116 is also referred to herein as K (i.e., a positive integer less than the total number of colors in source image 114). In one embodiment, cross-product module 106 applies a cross-product on pixel values of source image 114 to generate a cross-product rounded to integer values, which reduces the number of colors from the number of colors in the source image 114 to a reduced, initial number of colors in an initial target image (i.e., reduce the number of colors to an integer count that exceeds K plus a specified margin (e.g., a margin of K/2), where the integer count exceeds K plus the margin by a small, predefined amount).

Left alignment module 108 left aligns the rounded cross-product resulting from cross-product module 106, which provides for a computation of color distances.

Map generation module 110 generates a flat map if the target number of colors 116 is small; i.e., a number less than a predefined threshold number (e.g., a number<4096). If the target number colors is not small, map generation module 110 generates a map with unique colors as an index, with a count of pixels per unique reduced color in target image 118.

Tree module 112 creates a tree whose initial nodes are specified by the colors in the initial target image indicated by the left aligned rounded cross-product provided by cross-product module 106 and left alignment module 108. In one embodiment, tree module 112 (i) determines the least frequent color in the target image 118, (ii) determines the closest color in target image 118 (i.e., the color that is closest in distance to the least frequent color), (iii) creates a merged color that merges the least frequent color and the closest color, and (iv) replaces in target image 118 the least frequent color and the closest color with the merged color. Tree module 112 repeats the aforementioned steps (i) through (iv) until target image 118 is left with K colors.

The functionality of the components shown in FIG. 1 is described in more detail in the discussion of FIGS. 2A-2B, FIG. 3, and FIG. 4 presented below.

Process for Color Clustering for Preprocessing an Image

Figure 2A:
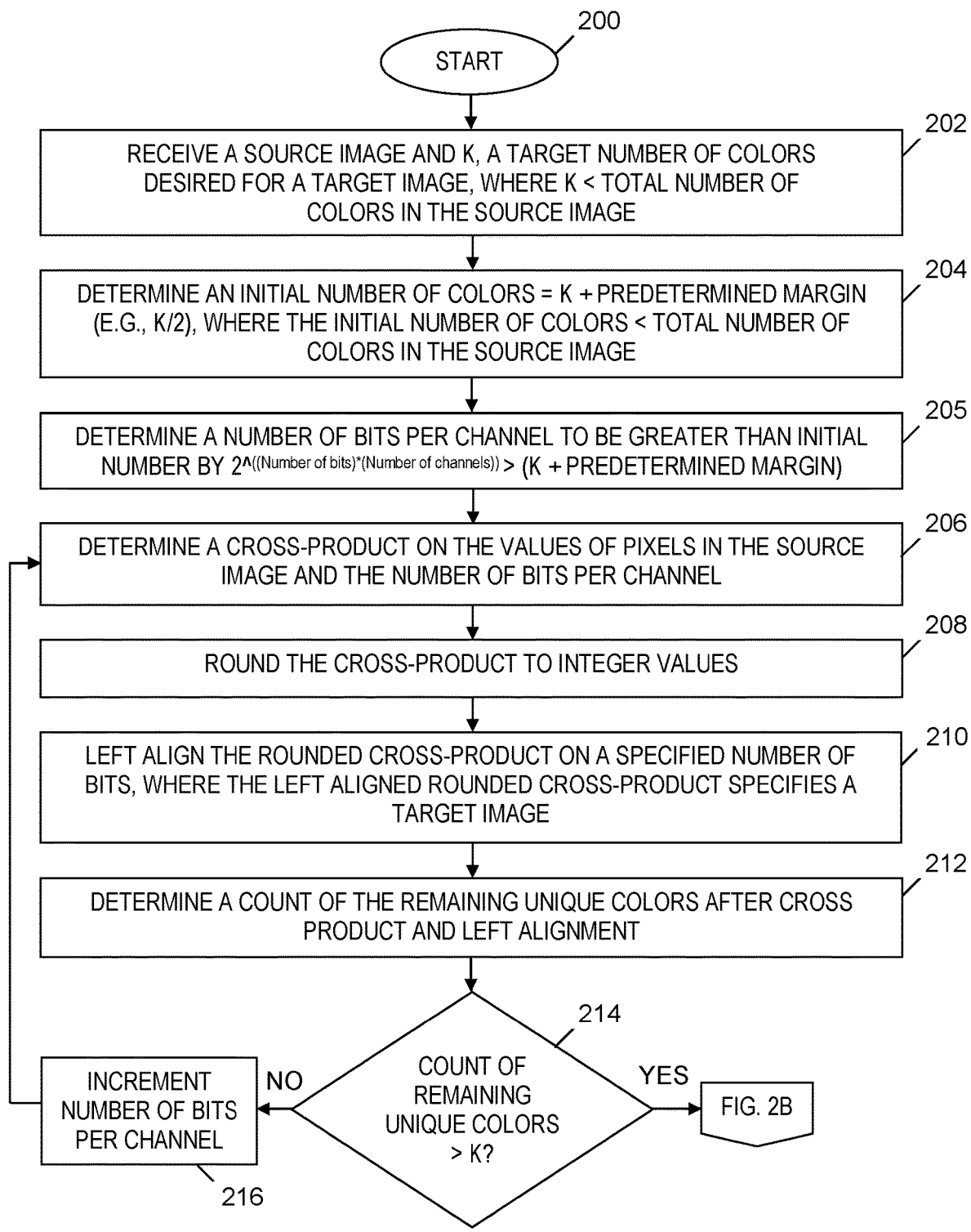
FIGS. 2A-2B depict a flowchart of a process of color clustering for preprocessing an image, where the process is implemented in the system of FIG. 1, in accordance with embodiments of the present invention.
Figure 2B:
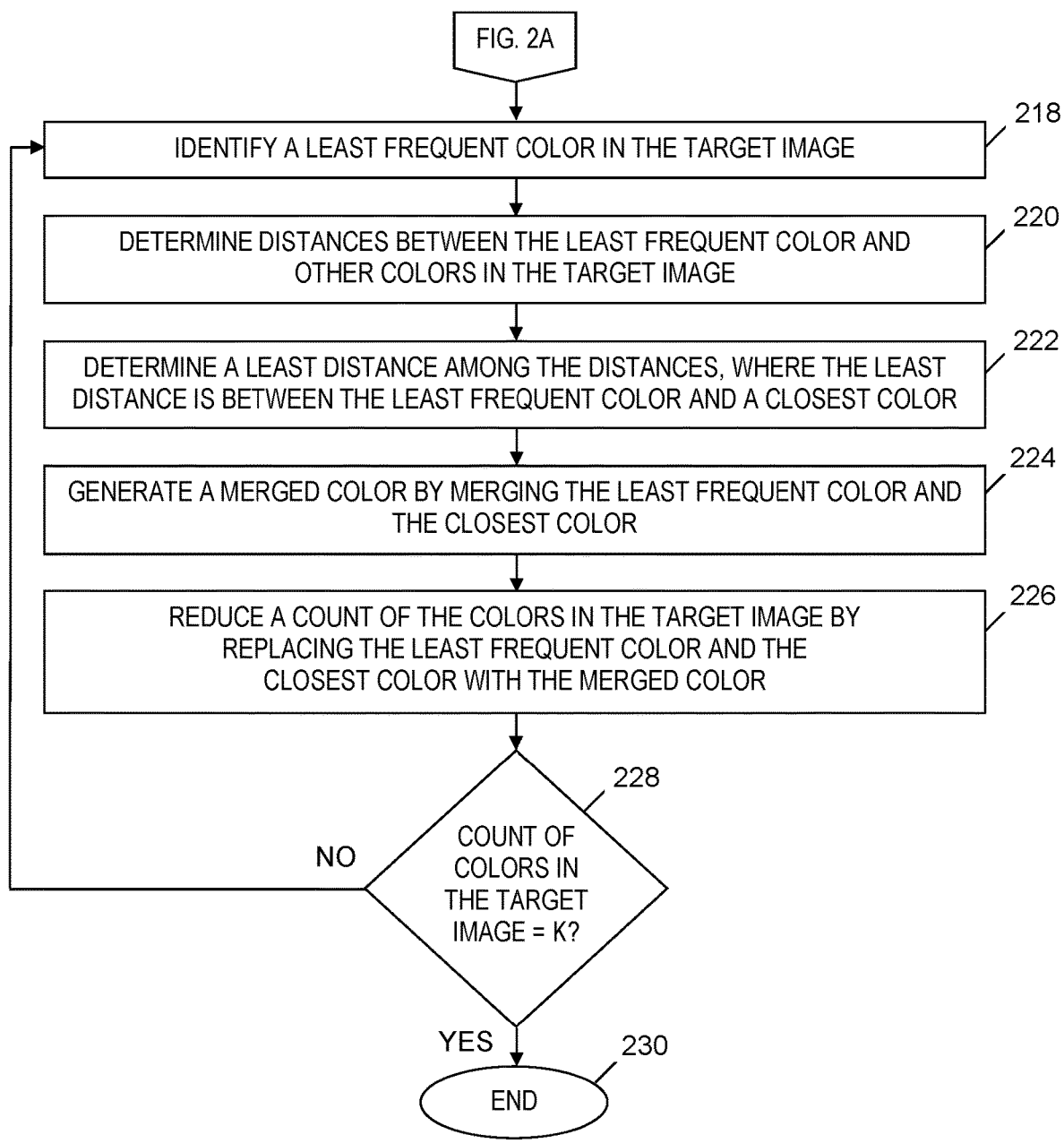

FIGS. 2A-2B depicts a flowchart of a process of color clustering for preprocessing an image, where the process is implemented in the system of FIG. 1, in accordance with embodiments of the present invention. The process of FIGS. 2A-2B begins at a start node 200 in FIG. 2A. In step 202, color clustering system 104 (see FIG. 1) receives source image 114 (see FIG. 1) and K (i.e., target number 116 (see FIG. 1) of colors for target image 118 (see FIG. 1)). In one embodiment, color clustering system 104 (see FIG. 1) normalizes source image 114 (see FIG. 1).

In step 204, color clustering system 104 (see FIG. 1) determines an initial number of colors as K+a predetermined margin (i.e., a margin that is a positive integer). In one embodiment, the predetermined margin is K/2. The initial number of colors is greater than K and less than the total number of colors in source image 114 (see FIG. 1). Adding the margin to K ensures the maintenance of a differentiated color histogram.

In step 205, color clustering system 104 (see FIG. 1) evaluates a bits per channel count to be greater than the initial number of colors by using the inequality presented below:

$$2^{((number\ of\ bits)*(number\ of\ channels))} > (K + \text{predetermined margin})$$

In step 206, color clustering system 104 (see FIG. 1) determines a cross-product on the values of pixels in source image 114 (see FIG. 1) and the number of bits per channel evaluated in step 205 to replace the colors in source image 114 (see FIG. 1) with colors whose count is the aforementioned initial number of colors.

In step 208, color clustering system 104 (see FIG. 1) rounds the cross-product determined in step 206 to integer values (i.e., generates a rounded cross-product). In one embodiment, cross-product module 106 (see FIG. 1) performs steps 206 and 208.

In one embodiment, to accelerate computation time, color clustering system 104 (see FIG. 1) uses pre-computed lookup tables to determine the cross-product. Alternatively, color clustering system 104 (see FIG. 1) uses fast integer rounding computation (i.e., bit shift and integer division) to compute the cross-product.

In step 210, color clustering system 104 (see FIG. 1) left aligns the rounded cross-product generated in step 208. The left aligned rounded cross-product specifies an initial target image, which is modified into successive tentative target image(s) by an iterative process described in subsequent steps of FIGS. 2A-2B until a final target image (i.e., target image 118 (see FIG. 1)) is generated, as described below. In one embodiment, left alignment module 108 performs step 210.

In one embodiment, step 210 includes left aligning on an 8 bits value to compute color distance.

For example, for 4 bits 191 round((b'1011 111')* 15/255)<<4=>176 (b'1011 000')

As one example, the following code performs steps 206, 208, and 210.

max_colors_number_for_significant_bits=2**significant_bits−1

\# Start with pixel color maximum value at 255 and compute cross product for
\# significant_bits bit
for color in range (0,256):

val=(max_colors_number_for_significant_bits*color)/(255)

\# Round cross product to integer value and left justify result on 8 bits
\#8 bits justification provides an improved visual result for merging colors
\# by color distance colors[significant_bits,color]=int(round(val)<(8−significant_bits))

Because the evaluation of the bits per channel count in step 205 may not lead to a left aligned rounded cross-product after step 210 that has a sufficient number of colors, steps 212, 214, and 216, as described below, are needed to ensure a sufficient number of colors.

In step 212, color clustering system 104 (see FIG. 1) determines a count of the remaining unique colors in the initial or tentative target image after the determination of the cross-product in step 206 and the left alignment in step 210.

In step 214, color clustering system 104 (see FIG. 1) determines whether the count of the remaining unique colors is greater than K. If color clustering system 104 (see FIG. 1) determines in step 214 that the count of the remaining unique colors is not greater than K, then the No branch of step 214 is taken and step 216 is performed.

In step 216, color clustering system 104 (see FIG. 1) increments the number of bits per channel. Following step 216, the process of FIGS. 2A-2B loops back to step 206 to determine a subsequent cross-product using the incremented number of bits per channel.

Returning to step 214, if color clustering system 104 (see FIG. 1) determines that the count of the remaining unique colors is greater than K, then the Yes branch of step 214 is taken, and the process of FIGS. 2A-2B continues with step 218 in FIG. 2B.

Subsequent to step 214 and prior to step 218, color clustering system 104 (see FIG. 1) creates either a flat map or a regular map with unique colors as an index, with a count of pixels per unique color in the reduced number of colors. Color clustering system 104 (see FIG. 1) uses the flat map or regular map to compute unique colors after the reduction in the number of colors. In one embodiment, map generation module 110 (see FIG. 1) generates a flat map if the target number of colors is less than a predefined number (e.g., less than 4096); otherwise, map generation module 110 (see FIG. 1) generates a regular map with the unique colors as an index. Using the flat map is faster for cases in which the target number of colors is small (e.g., less than 4096).

For example, the following code provides a color index for a flat map:

```
int colorindex=((cchannel[2]>>(8-significant))<<
    (2*significant))|((cchannel[1]>>(8-
    significant))<<(significant))|(cchannel[0]>>(8-
    significant))
```

For example, the following code provides the unique color index for a regular map:

```
int uniqueindex=cchannel[2]<<2*8+
    cchannel[1]<<1*8+cchannel[0]<<0*8
```

In one embodiment, to simplify the key access to the map, color clustering system 104 (see FIG. 1) merges all channels into a single integer key, where each channel is in a separate bit range in the integer key. In the case of a flat map, color clustering system 104 (see FIG. 1) generates the integer key by concatenating channel significant bits (i.e., significant bits corresponding to the channels).

For example, the three RGB channels are encoded on three bits and left aligned as:

rrr00000
ggg00000
bbb00000

In the three RGB channel example presented above, color clustering system 104 (see FIG. 1) extracts the channel significant bits of rrr, ggg, and bbb. Color clustering system 104 (see FIG. 1) then shifts the rrr two times the significant bits to the left, shifts the ggg one times the significant bits to the left, and keeps the bbb as it is (i.e., without shifting the bbb). The resulting unique index is rrrgggbbb.

Step 218 starts a loop of an iterative process within the process of FIGS. 2A-2B that includes steps 218, 220, 222, 224, 226, and 228. In the discussion of steps 218, 220, 222, 224, 226, and 228, a step being performed in the first iteration of the loop refers to the initial target image and a step being performed in a subsequent iteration of the loop refers to a current tentative target image.

Subsequent to step 214 and prior to step 218, tree module 112 (see FIG. 1) creates a tree whose initial leaves specify the colors in the initial target image. Hereinafter, in the discussion of FIGS. 2A-2B, the level of the tree that includes the initial leaves is referred to as the initial leaf level. In one embodiment, the tree initially has two levels below the root (i.e., a parent level and the initial leaf level below the parent level). Alternatively, the tree initially has exactly one level below the root (i.e., the initial leaf level) and the steps described below relative to FIGS. 2A-2B reduce the number of colors in the one level below the root to K colors.

In step 218, color clustering system 104 (see FIG. 1) identifies a least frequent color in the initial target image or current tentative target image. In one embodiment, tree module 112 (see FIG. 1) identifies an initial leaf or other node in the initial leaf level in the tree that specifies the least frequent color.

In one embodiment, prior to step 218, tree module (see FIG. 1) identifies a parent node in the parent level of the tree that has the most child nodes compared to other parent nodes in the tree. The subsequent steps in FIGS. 2A-2B starting with step 218 are applied to the colors specified by the child nodes of the identified parent node, but not to the other colors specified by child nodes of the other parent nodes (i.e., the parent nodes other than the identified parent node). For example, after identifying a parent node P in the parent level of the tree as having the most child nodes, color clustering system 104 (see FIG. 1) in step 218 identifies a node within the child nodes of the parent node P that specifies the least frequent color among the colors specified by the child nodes of the parent node P.

In step 220, color clustering system 104 (see FIG. 1) determines distances between the least frequent color identified in step 218 and other colors in the initial target image or current tentative target image. In one embodiment, color clustering system 104 (see FIG. 1) determines the distances in step 220 as the Euclidean distances between the least frequent color and the other colors in the initial or tentative target image (i.e., Euclidean distances between RGB (red-green-blue) values of pixels).

In step 222, color clustering system 104 (see FIG. 1) determines a least distance among the distances determined in step 220. Subsequent to step 222 and prior to step 224, color clustering system 104 (see FIG. 1) identifies a closest color to the least frequent color identified in step 218, where the closest color is the color in the initial or tentative target image whose distance to the least frequent color identified in step 218 is the least distance determined in step 222. In one embodiment, tree module 112 (see FIG. 1) identifies another leaf or other node in the initial leaf level in the tree that specifies the closest color.

In step 224, color clustering system 104 (see FIG. 1) generates a merged color by merging the least frequent color identified in step 218 and the closest color. By using color distances as the basis for generating the merged color, colors that are close to each other visually and which include a least frequent color are merged first.

In one or more embodiments, color clustering system 104 (see FIG. 1) determines or receives a first weight associated with the least frequent color and a second weight associated with the closest color and the generation of the merged color in step 224 is based on the first and second weights. In one embodiment, the first weight is based on a frequency of the least frequent color in the current tentative target image and the second weight is based on a frequency of the closets color in the current tentative target image.

In step 226, color clustering system 104 (see FIG. 1) reduces a count of the colors in the initial or tentative target image to form a new tentative target image by replacing the least frequent color identified in step 218 and the closest color with the merged color generated in step 224. In one embodiment, tree module 112 (see FIG. 1) in step 226 updates the tree by creating a new node in the tree at the initial leaf level, where the new node specifies the merged color, and pushes (i.e., moves) the nodes specifying the least frequent color and the closest color to a new level immediately below the initial leaf level. The new node has a branch to the node specifying the least frequent color and another branch to the node specifying the closest color. The color clustering system 104 (see FIG. 1) uses the pushing of the nodes to the new level to keep track of the initial colors that led to a merged color. Keeping track of the initial colors that led to the merged color provides a final processing of the image that corrects the initial image. Without keeping track of the initial colors, color clustering system 104 (see FIG. 1) would not know which color is to be replaced by the merged values, or which colors pertain to the same merge branch for computing a final average if required.

In one embodiment, after the generation of the merged color in step 224 and the replacement of the least frequent color and closest color by the merged color in step 226, color clustering system 104 (see FIG. 1) updates a map that associates the pixel values of the image with the initial number of colors to the reduced colors resulting from steps 224 and 226.

In one embodiment, for the most populated cross-product cluster with fewer than K clusters, color clustering system 104 (see FIG. 1) aggregates the sub-clusters based on colors distance.

In step 228, color clustering system 104 (see FIG. 1) determines whether the count of colors in the new tentative target image equals K. If color clustering system 104 (see FIG. 1) determines in step 228 that the count of colors in the new tentative target image does not equal K, then the No branch of step 228 is taken and the process of FIGS. 2A-2B loops back to step 218, with the new tentative target image becoming the current tentative target image.

If color clustering system 104 (see FIG. 1) determines in step 228 that the count of colors in the new tentative target image equals K, then the new tentative target image is a final target image (i.e., target image 118 (see FIG. 1)) having exactly K different colors, the Yes branch of step 228 is taken, and the process of FIGS. 2A-2B ends at an end node 230.

Alternatively, after the Yes branch of step 228 is taken, color clustering system 104 (see FIG. 1) generates the final target image (i.e., target image 118 in FIG. 1) by replacing the colors in source image 114 (see FIG. 1) with the colors in the new tentative target image.

In one embodiment, color clustering system 104 (see FIG. 1) performs an optional post-processing after the Yes branch of step 228 to generate the final target image 118 (see FIG. 1). The post-processing may be performed in response to a user input or based on a default value of a parameter. Color clustering system 104 (see FIG. 1) generates a mapping of the K colors in the tentative target image to respective pixel values in source image 114 (see FIG. 1). For each unique color cluster in the tentative target image and based on the generated mapping, color clustering system 104 (see FIG. 1) identifies respective pixel values in source image 114 (see FIG. 1). Based on the identified pixel values, color clustering system 104 (see FIG. 1) computes respective weighted averages for the clusters. Color clustering system 104 (see FIG. 1) generates the final target image 118 (see FIG. 1) by replacing the pixel values in the source image 114 (see FIG. 1) with the weighted averages.

Example

Figure 3:
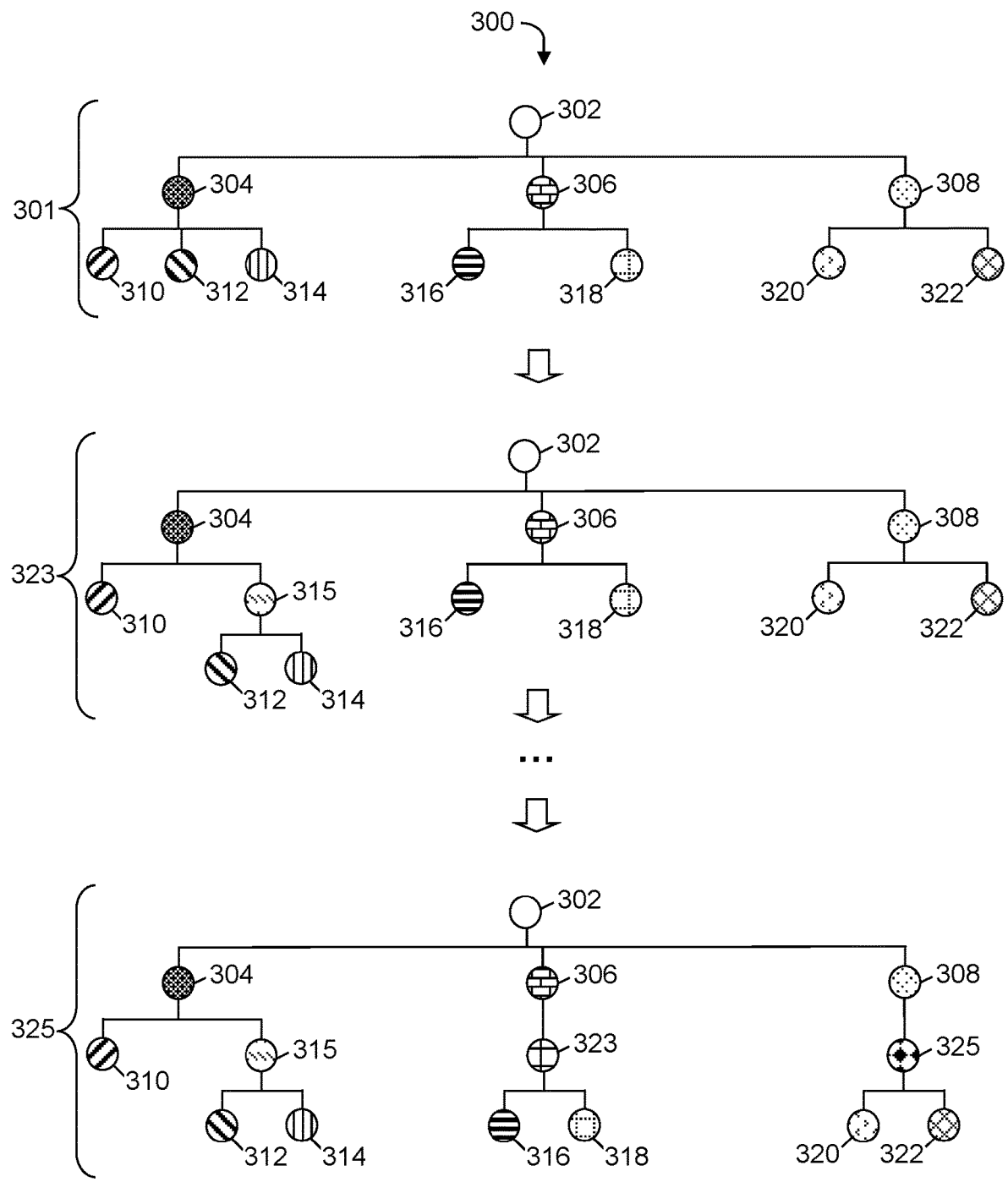
FIG. 3 is an example of color reduction using a tree created in the process of FIGS. 2A-2B and the system of FIG. 1, in accordance with embodiments of the present invention.

FIG. 3 is an example 300 of color reduction using a tree created in the process of FIGS. 2A-2B and the system of FIG. 1, in accordance with embodiments of the present invention. Example 300 includes a tree 301 created by tree module 112 (see FIG. 1) with K=4. Tree 301 includes a root node 302, parent nodes 304, 306, and 308 (i.e., number of parent nodes<K), and child nodes 310, 312, 314, 316, 318, 320, and 322 (i.e., number of child nodes>K). The patterns shown in the parent and child nodes indicate different colors in a target image. Tree module 112 (see FIG. 1) creates the child nodes 310, 312, 314, 316, 318, 320, and 322 and then computes parent node 304 based on child nodes 310, 312, and 314, parent node 306 based on child nodes 316 and 318, and parent node 308 based on child nodes 320 and 322. Child nodes 310, 312, 314, 316, 318, 320, and 322 are at the initial leaf level of tree 301.

Tree module 112 (see FIG. 1) identifies the parent node that has the maximum number of child nodes (i.e., parent node 304). In step 218 (see FIG. 2A), tree module 112 (see FIG. 1) determines that child node 314 indicates the least frequent color in the target image. In step 222 (see FIG. 2A), tree module 112 (see FIG. 1) identifies child node 312 as indicating the closest color to the least frequent color indicated by child node 314. In step 224 (see FIG. 2B), tree module 112 (see FIG. 1) generates a merged color by computing the weighted average of the least frequent color and the closest color (i.e., the colors indicated by child nodes 314 and 312, respectively). In step 224, tree module 112 (see FIG. 1) merges the colors indicated by child nodes 314 and 312 by using the weighted average to determine the merged color.

Tree module 112 (see FIG. 1) updates tree 301 to become a tree 323, which includes a new child node 315 at the initial leaf level, where the new child node 315 indicates the merged color (i.e., specified by the weighted average of child nodes 314 and 312) and which has moved child nodes 314 and 312 to a new level of tree 323 immediately below the initial leaf level (i.e., the number of child nodes in the initial leaf level in tree 323 is reduced by one from the number of child nodes in the initial leaf level in tree 301).

After one or more successive iterations of steps 218, 220, 222, 224, 226, and 228 in FIG. 2B, tree module 112 (see FIG. 1) updates one or more successive trees (not shown) to become a tree 325, which includes a first new child node 323 in the initial leaf level indicating a color merged from the colors indicated by child nodes 316 and 318 in tree 323, and a second new child node 325 in the initial leaf level indicating a color merged from the colors indicated by child nodes 320 and 322. To form tree 325, tree module 112 (see FIG. 1) has moved child nodes 316 and 318 to a new level immediately below the initial leaf level, so that child nodes 316 and 318 are branches from new child node 323. Furthermore, tree module 112 (see FIG. 1) has moved child nodes 320 and 322 to a new level immediately below the initial leaf level, so that child nodes 320 and 322 are branches from new child node 325. The iteration of steps 218, 220, 222, 224, 226, and 228 in FIG. 2B ends with the generation of tree 325 because the count of the child nodes in the initial leaf level in tree 325 equals K (i.e., the count of the number of different colors in the target image as indicated by the number of child nodes in the initial leaf level is 4, which equals K, which leads to the Yes branch of step 228 in FIG. 2B and the end node 230 in FIG. 2B).

Computer System

Figure 4:
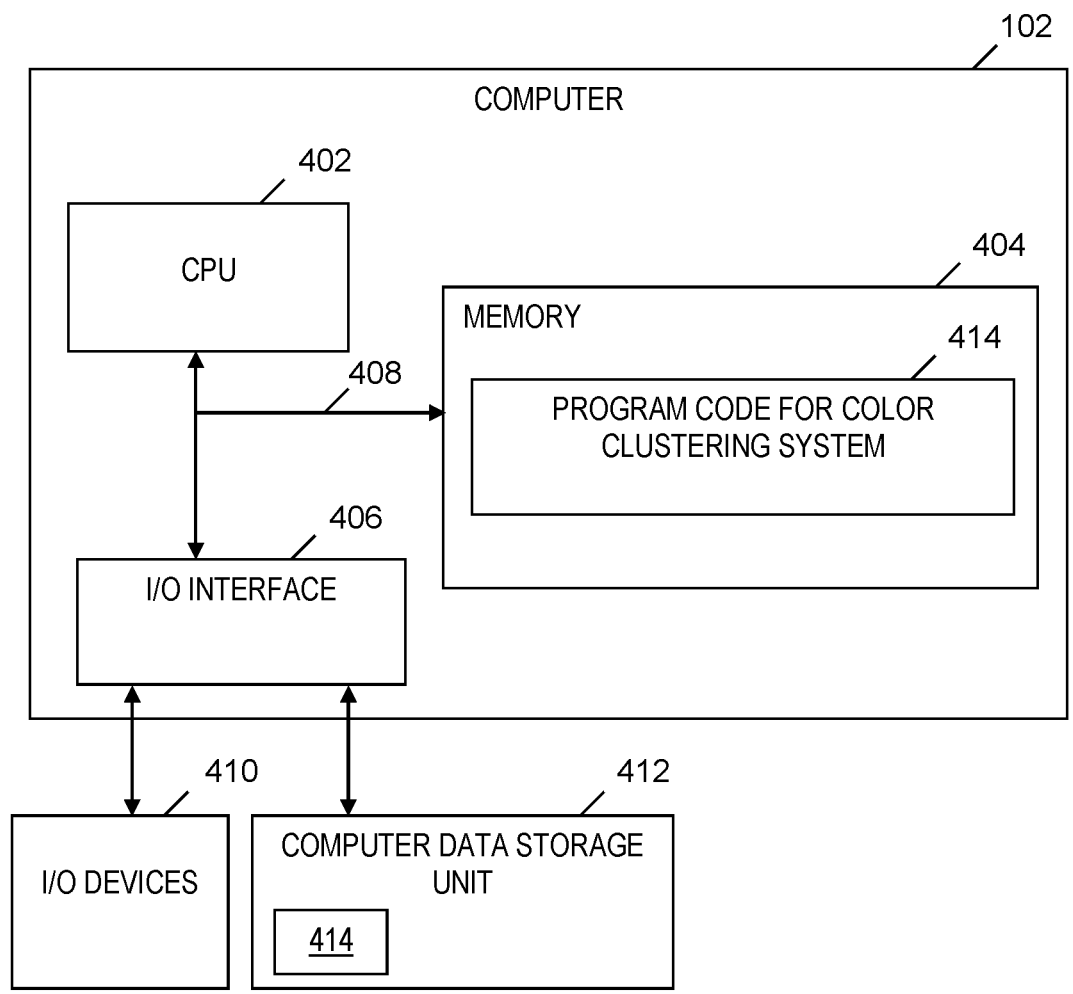
FIG. 4 is a block diagram of a computer that is included in the system of FIG. 1 and that implements the process of FIGS. 2A-2B, in accordance with embodiments of the present invention.

FIG. 4 is a block diagram of a computer that is included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for color clustering system 104 (see FIG. 1) to perform a method of color clustering for preprocessing an image, where the instructions are executed by CPU 402 via memory 404. CPU 402 may include a single processing unit or processor or be distributed across one or more processing units or one or more processors in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems or a plurality of computer readable storage media in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes one or more known computer readable storage media, where a computer readable storage medium is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to color cluster for preprocessing an image. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to color clustering for preprocessing an image. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to color cluster for preprocessing an image. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of color clustering for preprocessing an image.

While it is understood that program code 414 for color clustering for preprocessing an image may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of color clustering for preprocessing an image. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising:
a central processing unit (CPU);
a memory coupled to the CPU; and
one or more computer readable storage media coupled to the CPU, the one or more computer readable storage media collectively containing instructions that are executed by the CPU via the memory to implement a method of color clustering for preprocessing an image, the method comprising:
the computer system determining an initial number of colors by adding an integer margin to K, K being an integer equal to a target number of colors less than a total number of colors in a source image, and the initial number of colors being less than the total number of colors in the source image;
the computer system determining a number of bits per channel which is greater than the initial number of colors based on $2^{((a\ number\ of\ bits)*(a\ number\ of\ channels))}$ >(K+the integer margin);
the computer system determining a cross-product on the values of pixels in the source image and the number of bits per channel;
the computer system rounding the cross-product to integer values;
the computer system left aligning the rounded cross-product on a specified number of bits, the left aligned rounded cross-product specifying a target image having a number of colors equal to the initial number of colors;
the computer system determining a count of remaining unique colors in the target image after the determining the cross-product and the left aligning;
the computer system determining that the count of the remaining unique colors is greater than K;
repeating the computer system identifying a least frequent color in the target image that has a least frequency among colors in the target image, the computer system determining distances between the least frequent color and other colors in the target image, the computer system determining a least distance among the distances, the least distance being between the least frequent color and a closest color among the other colors, the computer system generating a merged color by merging the least frequent color and the closest color, and the computer system reducing a count of the colors in the target image by replacing the least frequent color and the closest color with the merged color in the colors in the target image, until the count of the colors in the target image is equal to K and the target image is a final target image having K colors.

2. The computer system of claim 1, wherein the method further comprises:
the computer system determining an initial count of remaining unique colors after the determining the cross-product and the left aligning;
the computer system determining that the initial count of the remaining unique colors is not greater than K;
in response to the determining that the initial count is not greater than K, the computer system incrementing the number of bits per channel; and
using the incremented number of bits per channel, the computer system repeating the determining the cross-product, the rounding the cross-product, the left aligning the rounded cross-product, and determining a new count of the remaining unique colors, until the new count of the remaining unique colors is greater than K.

3. The computer system of claim 1, wherein the method further comprises:
the computer system creating a tree whose leaves in an initial leaf level of the tree specify the colors in the target image, the leaves including a first leaf specifying the least frequent color and a second leaf specifying the closest color, wherein the replacing the least frequent color and the closest color with the merged color in the colors in the target image includes creating a new node in the tree specifying the merged color and moving the first leaf specifying the least frequent color and the second leaf specifying the closest color to a new level of the tree below the initial leaf level, the first and second leaves being on branches from the new node.

4. The computer system of claim 1, wherein the method further comprises:
the computer system determining a first weight associated with the least frequent color and a second weight associated with the closest color, the first weight being based on a frequency of the least frequent color in the target image and the second weight being based on a frequency of the closest color in the target image, wherein the generating the merged color is based on the first and second weights.

5. The computer system of claim 1, wherein the method further comprises:
the computer system determining that the number of colors in the target image is less than a threshold number of colors;
based on the number of colors in the target image being less than the threshold number of colors, the computer system generating a flat map for computing unique colors after the reducing the count of the colors in the target image; and
the computer system generating a unique key to index the flat map by concatenating significant bits of channels for the colors in the target image.

6. The computer system of claim 1, wherein the method further comprises:
the computer system generating a mapping of the K colors in the final target image to respective pixel values in the source image;
for colors in the final target image and based on the generated mapping, the computer system identifying respective pixel values in the source image;
based on the identified pixel values, the computer system computing respective weighted averages for the colors; and
the computer system generating the final target image by replacing pixel values in the source image with the weighted averages.

7. The computer system of claim 1, wherein the determining the cross-product comprises:
the computer system employing a pre-computed lookup table of cross-products for a determination of the cross-product.

8. A computer program product for color clustering for preprocessing an image, the computer program product comprising:
  one or more computer readable storage media having computer readable program code collectively stored on the one or more computer readable storage media, the computer readable program code being executed by a central processing unit (CPU) of a computer system to cause the computer system to perform a method comprising:
    the computer system determining an initial number of colors by adding an integer margin to K, K being an integer equal to a target number of colors less than a total number of colors in a source image, and the initial number of colors being less than the total number of colors in the source image;
    the computer system determining a number of bits per channel which is greater than the initial number of colors based on $2^{((a\ number\ of\ bits)*(a\ number\ of\ channels))}$>(K+the integer margin);
    the computer system determining a cross-product on the values of pixels in the source image and the number of bits per channel;
    the computer system rounding the cross-product to integer values;
    the computer system left aligning the rounded cross-product on a specified number of bits, the left aligned rounded cross-product specifying a target image having a number of colors equal to the initial number of colors;
    the computer system determining a count of remaining unique colors in the target image after the determining the cross-product and the left aligning;
    the computer system determining that the count of the remaining unique colors is greater than K;
    repeating the computer system identifying a least frequent color in the target image that has a least frequency among colors in the target image, the computer system determining distances between the least frequent color and other colors in the target image, the computer system determining a least distance among the distances, the least distance being between the least frequent color and a closest color among the other colors, the computer system generating a merged color by merging the least frequent color and the closest color, and the computer system reducing a count of the colors in the target image by replacing the least frequent color and the closest color with the merged color in the colors in the target image, until the count of the colors in the target image is equal to K and the target image is a final target image having K colors.

9. The computer program product of claim 8, wherein the method further comprises:
  the computer system determining an initial count of remaining unique colors after the determining the cross-product and the left aligning;
  the computer system determining that the initial count of the remaining unique colors is not greater than K;
  in response to the determining that the initial count is not greater than K, the computer system incrementing the number of bits per channel; and
  using the incremented number of bits per channel, the computer system repeating the determining the cross-product, the rounding the cross-product, the left aligning the rounded cross-product, and determining a new count of the remaining unique colors, until the new count of the remaining unique colors is greater than K.

10. The computer program product of claim 8, wherein the method further comprises:
  the computer system creating a tree whose leaves in an initial leaf level of the tree specify the colors in the target image, the leaves including a first leaf specifying the least frequent color and a second leaf specifying the closest color, wherein the replacing the least frequent color and the closest color with the merged color in the colors in the target image includes creating a new node in the tree specifying the merged color and moving the first leaf specifying the least frequent color and the second leaf specifying the closest color to a new level of the tree below the initial leaf level, the first and second leaves being on branches from the new node.

11. The computer program product of claim 8, wherein the method further comprises:
  the computer system determining a first weight associated with the least frequent color and a second weight associated with the closest color, the first weight being based on a frequency of the least frequent color in the target image and the second weight being based on a frequency of the closest color in the target image, wherein the generating the merged color is based on the first and second weights.

12. The computer program product of claim 8, wherein the method further comprises:
  the computer system determining that the number of colors in the target image is less than a threshold number of colors;
  based on the number of colors in the target image being less than the threshold number of colors, the computer system generating a flat map for computing unique colors after the reducing the count of the colors in the target image; and
  the computer system generating a unique key to index the flat map by concatenating significant bits of channels for the colors in the target image.

13. The computer program product of claim 8, wherein the method further comprises:
  the computer system generating a mapping of the K colors in the final target image to respective pixel values in the source image;
  for colors in the final target image and based on the generated mapping, the computer system identifying respective pixel values in the source image;
  based on the identified pixel values, the computer system computing respective weighted averages for the colors; and
  the computer system generating the final target image by replacing pixel values in the source image with the weighted averages.

14. The computer program product of claim 8, wherein the determining the cross-product comprises:
  the computer system employing a pre-computed lookup table of cross-products for determining the cross-product.

15. A computer-implemented method comprising:
  determining, by one or more processors, an initial number of colors by adding an integer margin to K, K being an integer equal to a target number of colors less than a total number of colors in a source image, and the initial number of colors being less than the total number of colors in the source image;

determining, by the one or more processors, a number of bits per channel which is greater than the initial number of colors based on $2^{((a\ number\ of\ bits)*(a\ number\ of\ channels))} > (K$ the integer margin);

determining, by the one or more processors, a cross-product on the values of pixels in the source image and the number of bits per channel;

rounding, by the one or more processors, the cross-product to integer values;

left aligning, by the one or more processors, the rounded cross-product on a specified number of bits, the left aligned rounded cross-product specifying a target image having a number of colors equal to the initial number of colors;

determining, by the one or more processors, a count of remaining unique colors in the target image after the determining the cross-product and the left aligning;

determining, by the one or more processors, that the count of the remaining unique colors is greater than K;

repeating, by the one or more processors, identifying a least frequent color in the target image that has a least frequency among colors in the target image, determining distances between the least frequent color and other colors in the target image, determining a least distance among the distances, the least distance being between the least frequent color and a closest color among the other colors, generating a merged color by merging the least frequent color and the closest color, and reducing a count of the colors in the target image by replacing the least frequent color and the closest color with the merged color in the colors in the target image, until the count of the colors in the target image is equal to K and the target image is a final target image having K colors.

16. The method of claim 15, further comprising:

determining, by the one or more processors, an initial count of remaining unique colors after the determining the cross-product and the left aligning;

determining, by the one or more processors, that the initial count of the remaining unique colors is not greater than K;

in response to the determining that the initial count is not greater than K, incrementing, by the one or more processors, the number of bits per channel; and using the incremented number of bits per channel, repeating, by the one or more processors, the determining the cross-product, the rounding the cross-product, the left aligning the rounded cross-product, and determining a new count of the remaining unique colors, until the new count of the remaining unique colors is greater than K.

17. The method of claim 15, further comprising:

creating, by the one or more processors, a tree whose leaves in an initial leaf level of the tree specify the colors in the target image, the leaves including a first leaf specifying the least frequent color and a second leaf specifying the closest color, wherein the replacing the least frequent color and the closest color with the merged color in the colors in the target image includes creating a new node in the tree specifying the merged color and moving the first leaf specifying the least frequent color and the second leaf specifying the closest color to a new level of the tree below the initial leaf level, the first and second leaves being on branches from the new node.

18. The method of claim 15, further comprising:

determining, by the one or more processors, a first weight associated with the least frequent color and a second weight associated with the closest color, the first weight being based on a frequency of the least frequent color in the target image and the second weight being based on a frequency of the closest color in the target image, wherein the generating the merged color is based on the first and second weights.

19. The method of claim 15, further comprising:

determining, by the one or more processors, that the number of colors in the target image is less than a threshold number of colors;

based on the number of colors in the target image being less than the threshold number of colors, the computer system generating a flat map for computing unique colors after the reducing the count of the colors in the target image; and the computer system generating a unique key to index the flat map by concatenating significant bits of channels for the colors in the target image.

20. The method of claim 15, further comprising:

providing at least one support service for at least one of creating, integrating, hosting, maintaining, and deploying computer readable program code in the computer, the program code being executed by a processor of the computer to implement the determining the initial number of colors, the determining the number of bits per channel, the determining the cross-product on the values of the pixels in the source image and the number of bits per channel, the rounding the cross-product to the integer values, the left aligning the rounded cross-product, the determining the count of the remaining unique colors, the determining that the count of the remaining unique colors is greater than K, and the repeating of the identifying the least frequent color, the determining the distances between the least frequent color and the other colors in the target image, the determining the least distance among the distances, the generating the merged color, and the reducing the count of the colors in the target image.

* * * * *